United States Patent
Wang et al.

(10) Patent No.: US 11,196,651 B2
(45) Date of Patent: Dec. 7, 2021

(54) BFD OFFLOAD IN VIRTUAL NETWORK INTERFACE CONTROLLER

(71) Applicant: VMware, Inc., Palo Alto, CA (US)

(72) Inventors: Yong Wang, Sunnyvale, CA (US); Boon Ang, Saratoga, CA (US); Guolin Yang, San Jose, CA (US); Wenyi Jiang, Fremont, CA (US)

(73) Assignee: VMWARE, INC., Palo Alto, CA (US)

( * ) Notice: Subject to any disclaimer, the term of this patent is extended or adjusted under 35 U.S.C. 154(b) by 91 days.

(21) Appl. No.: 16/661,879

(22) Filed: Oct. 23, 2019

(65) Prior Publication Data

US 2021/0126848 A1 Apr. 29, 2021

(51) Int. Cl.
*H04L 12/26* (2006.01)
*H04L 12/46* (2006.01)
*H04L 12/24* (2006.01)
*H04L 29/08* (2006.01)

(52) U.S. Cl.
CPC ...... *H04L 43/0811* (2013.01); *H04L 12/4633* (2013.01); *H04L 12/4641* (2013.01); *H04L 41/0686* (2013.01); *H04L 67/141* (2013.01)

(58) Field of Classification Search
CPC ............. H04L 12/4633; H04L 12/4641; H04L 41/0686; H04L 43/0811; H04L 67/141; H04L 43/10; H04L 67/2861; G06F 9/4558; G06F 2009/45591; G06F 2009/45595
See application file for complete search history.

(56) References Cited

U.S. PATENT DOCUMENTS

| | | | | |
|---|---|---|---|---|
| 7,561,527 | B1 * | 7/2009 | Katz | H04L 43/50 370/241 |
| 10,050,855 | B1 * | 8/2018 | Singh | H04L 45/245 |
| 2005/0249123 | A1 * | 11/2005 | Finn | H04L 43/10 370/242 |

(Continued)

FOREIGN PATENT DOCUMENTS

WO 2021080662 A1 4/2021

OTHER PUBLICATIONS

Author Unknown, "Bidirectional Forwarding Detection," Wikipedia, Oct. 15, 2020, 2 pages, Wikipedia.com.

(Continued)

*Primary Examiner* — Thomas J Dailey
(74) *Attorney, Agent, or Firm* — Adeli LLP (57) ABSTRACT

Some embodiments provide a method for monitoring the status of a network connection between first and second host computers. The method is performed in some embodiments by a tunnel monitor executing on the first host computer that also separately executes a machine, where the machine uses a tunnel to send and receive messages to and from the second host computer. The method establishes a liveness channel with the machine to iteratively determine whether the first machine is operational. The method further establishes a monitoring session with the second host computer to iteratively determine whether the tunnel is operational. When a determination is made through the liveness channel that the machine is no longer operational, the method terminates the monitoring session with the second host computer. When a determination is made that the tunnel is no longer operational, the method notifies the machine through the liveness channel.

17 Claims, 7 Drawing Sheets

(56) References Cited

U.S. PATENT DOCUMENTS

| | | |
|---|---|---|
| 2008/0172582 A1* | 7/2008 | Sinicrope ............. H04L 63/164 714/48 |
| 2010/0077395 A1 | 3/2010 | Edwards et al. |
| 2016/0050102 A1 | 2/2016 | Natarajan et al. |
| 2018/0102951 A1* | 4/2018 | Wu .................... H04L 43/0811 |
| 2018/0262387 A1* | 9/2018 | Mathew ............. H04L 41/0668 |
| 2018/0270084 A1 | 9/2018 | Pázmány et al. |
| 2019/0306060 A1 | 10/2019 | Sharma |

OTHER PUBLICATIONS

Coles, Alistair, et al., "Cells: A Self-Hosting Virtual Infrastructure Service," 2012 IEEE/ACM 5th International Conference on Utility and Cloud Computing, Nov. 5-8, 2012, 8 pages, IEEE, Chicago, IL.
Non-Published Commonly Owned Related International Patent Application PCT/US2020/043646 with similar specification, filed Jul. 26, 2020, 32 pages, VMware, Inc.
PCT International Search Report and Written Opinion of International Patent Application PCT/US2020/043646 (WO), dated Oct. 26, 2020, 21 pages, International Searching Authority (EPO).
Katz, D., et al., "Bidirectional Forwarding Detection (BFD)," RFC5880, Jun. 2010, 49 pages, IETF.

* cited by examiner

BFD OFFLOAD IN VIRTUAL NETWORK INTERFACE CONTROLLER

BACKGROUND

In computer networking, connectivity detection protocols (such as Bidirectional Forwarding Detection, or BFD) are used to detect connectivity failures between two endpoints at different network layers (e.g., from the physical layer all the way up to the application layer). These protocols generally receive and transmit control packets over the data plane being monitored, separated by a small configurable time interval. Many Network Function Virtualization (NFV) appliances depend on protocols such as BFD for detecting whether applications are operational inside a virtual machine (also known as "liveness detection").

Figure 1:
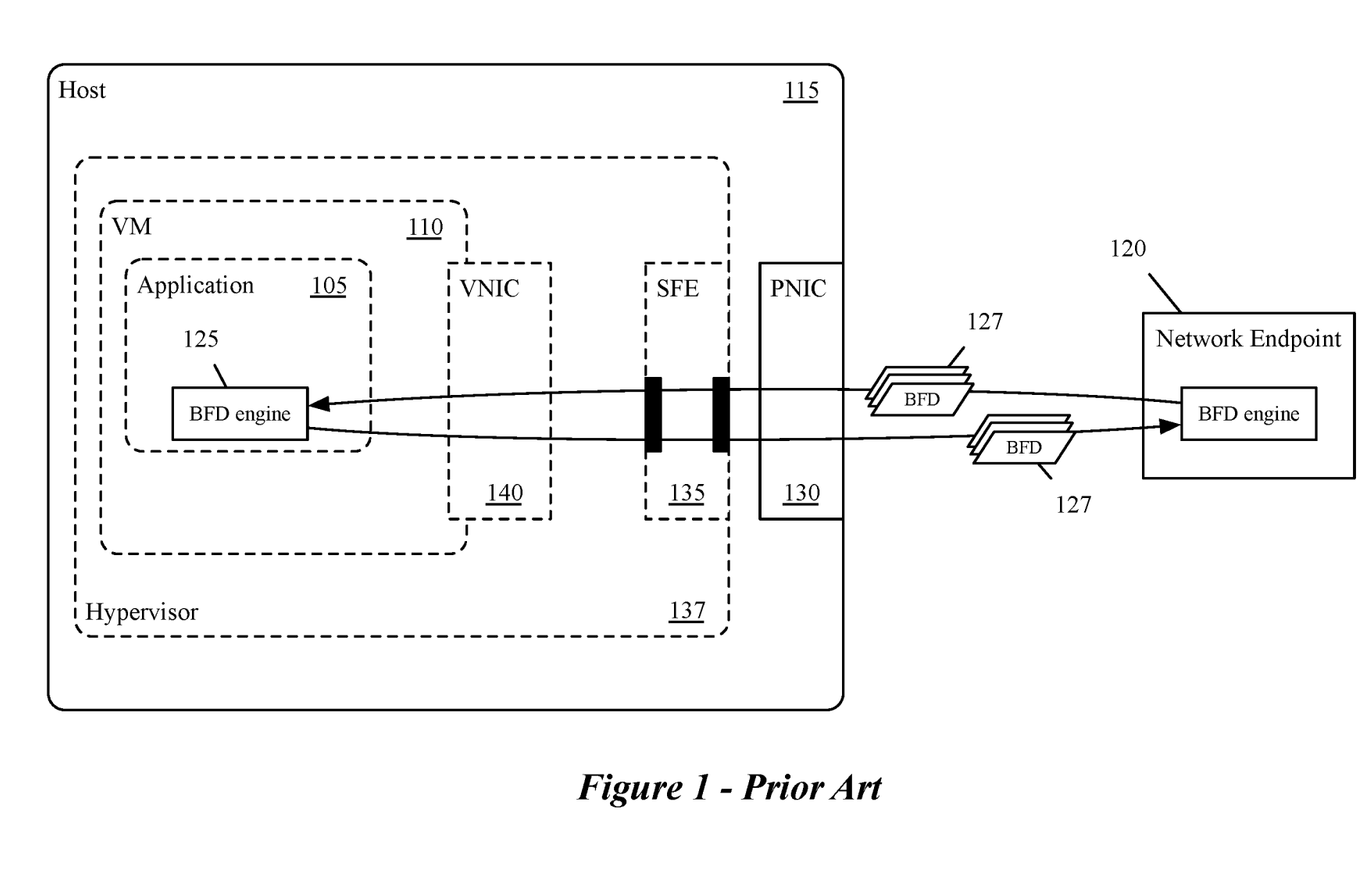
FIG. 1 conceptually illustrates a prior art scenario of an application running in a virtual machine (VM) that uses BFD to monitor its network connection.

Prior art FIG. 1 conceptually illustrates a typical scenario of an application 105 running in a virtual machine (VM) 110, executing on a host computer 115, and using BFD to monitor its network connection to a network endpoint 120 (e.g., at another host computer or network device). The application 105 runs the BFD engine (which implements the BFD state machine) 125, so the BFD packets 127 must transit from the network endpoint 120 over the datapath channel (e.g., through a physical network interface card or PNIC 130 of the host computer, a software forwarding element (SFE) 135 that performs switching and routing for all machines implemented by the host's virtualization software (e.g., a hypervisor) 137, and a virtual network interface card or VNIC 140 associated with the VM 110), all the way to the application 105 in order to be successfully detected while the network connection is operating. Data traffic (not shown) between the application 105 and the network endpoint 120, and BFD packets 127, traverse the datapath through the VNIC 140, logical ports of the SFE 135 (conceptually depicted as black boxes), and the PNIC 130. However, the BFD protocol does not support packet prioritizing or quality of service (QoS) to ensure that BFD packets are recognized and expedited through the datapath. This means that under heavy traffic, BFD packets 127 can be dropped by any intermediate forwarding device or NIC 130-140 along the datapath between the application 105 and the network endpoint 120, resulting in false negative failure detection. Furthermore, implementing a monitoring engine at the application level consumes scarce processing resources provided to the VM 110 by virtualization software 137.

BRIEF SUMMARY

Some embodiments of the invention provide a method for offloading the processing for a connectivity detection protocol (e.g., Bidirectional Forwarding Detection, or BFD) from an application in a VM. The connectivity protocol is implemented by a monitoring engine, which in some embodiments, is offloaded to the virtual network interface card (VNIC) of the hypervisor. In other embodiments, the monitoring engine is offloaded to the physical network interface card (PNIC) of the host computer that executes the hypervisor. The offloaded monitoring engine establishes a monitoring session, on behalf of the application, with a network endpoint with which the application is communicating.

The monitoring engine in some embodiments establishes a communications channel with the application, in order to periodically verify that the application is operational (also referred to as a "liveness channel"). This liveness channel may be a shared memory, an application programming interface (API), or other communication interface. In some embodiments, the application updates the monitoring engine with its operational status. For example, the monitoring engine periodically receives status messages via the liveness channel from the application. The monitoring engine then interprets failure to receive expected status messages within an interval of time, as failure of the application. In other embodiments, the monitoring engine polls the application for its operational status. For example, the monitoring engine periodically queries the application via the liveness channel for its status. Failure to reply to the query is then interpreted as failure of the application. If the monitoring engine determines (e.g., via updating or polling) that the application has failed, then the monitoring engine terminates the monitoring session.

As noted above, the monitoring engine establishes the monitoring session with the network endpoint with which the application is communicating (e.g., exchanging data messages). For example, the network endpoint may be another VM on another host computer. The monitoring engine regularly exchanges control messages (e.g., monitoring packets) with the network endpoint during the session, according to the connectivity detection protocol. The network endpoint in some embodiments also executes a monitoring engine to send and receive the control messages with the first monitoring engine. These control messages are sent over the data plane, using the same network connection in some embodiments as the data messages that the application exchanges with the network endpoint. The monitoring engine then interprets failure to receive expected control messages as failure of the network connection. If the monitoring engine determines that the monitoring session with the network endpoint has failed, then the monitoring engine notifies the application, through the liveness channel in some embodiments.

In some embodiments, the monitoring engine establishes the monitoring session after receiving a set of parameters from the application. These parameters are received in some such embodiments through the liveness channel. The monitoring engine uses these parameters to configure the monitoring session. Examples of these parameters include an address of the VM that operates the application, an address of the network endpoint, and a frequency of the control messages sent over the network connection. The monitoring engine may also update the monitoring session configuration, or terminate the session, based on instructions received from the application.

The monitoring engine is able to establish monitoring sessions with multiple network endpoints in some embodiments, on behalf of multiple applications. These applications may be operating in the same VM or on different VMs executing on the host computer. The network endpoints with which the different applications communicate may be different applications in different VMs on different host computers. These communications may be implemented over multiple network connections.

The preceding Summary is intended to serve as a brief introduction to some embodiments of the invention. It is not meant to be an introduction or overview of all of the inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed.

Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a method for offloading the processing for a connectivity detection protocol from an application in a VM to the underlying hypervisor. The connectivity protocol is implemented by a monitoring engine, which in some embodiments, is offloaded to the virtual network interface card (VNIC) of the hypervisor. In other embodiments, the monitoring engine is offloaded to the physical network interface card (PNIC) of the host computer that executes the hypervisor. The offloaded monitoring engine establishes a monitoring session, on behalf of the application, with a network endpoint with which the application is communicating.

In some embodiments, described in more detail with reference to the figures and processes below, the connectivity protocol is the Bidirectional Forwarding Detection (BFD) protocol. For example, FIG. 2 conceptually illustrates offloading a BFD monitoring session from an application to a VNIC in some embodiments. In other embodiments, other connectivity protocols are used.

Figure 2:
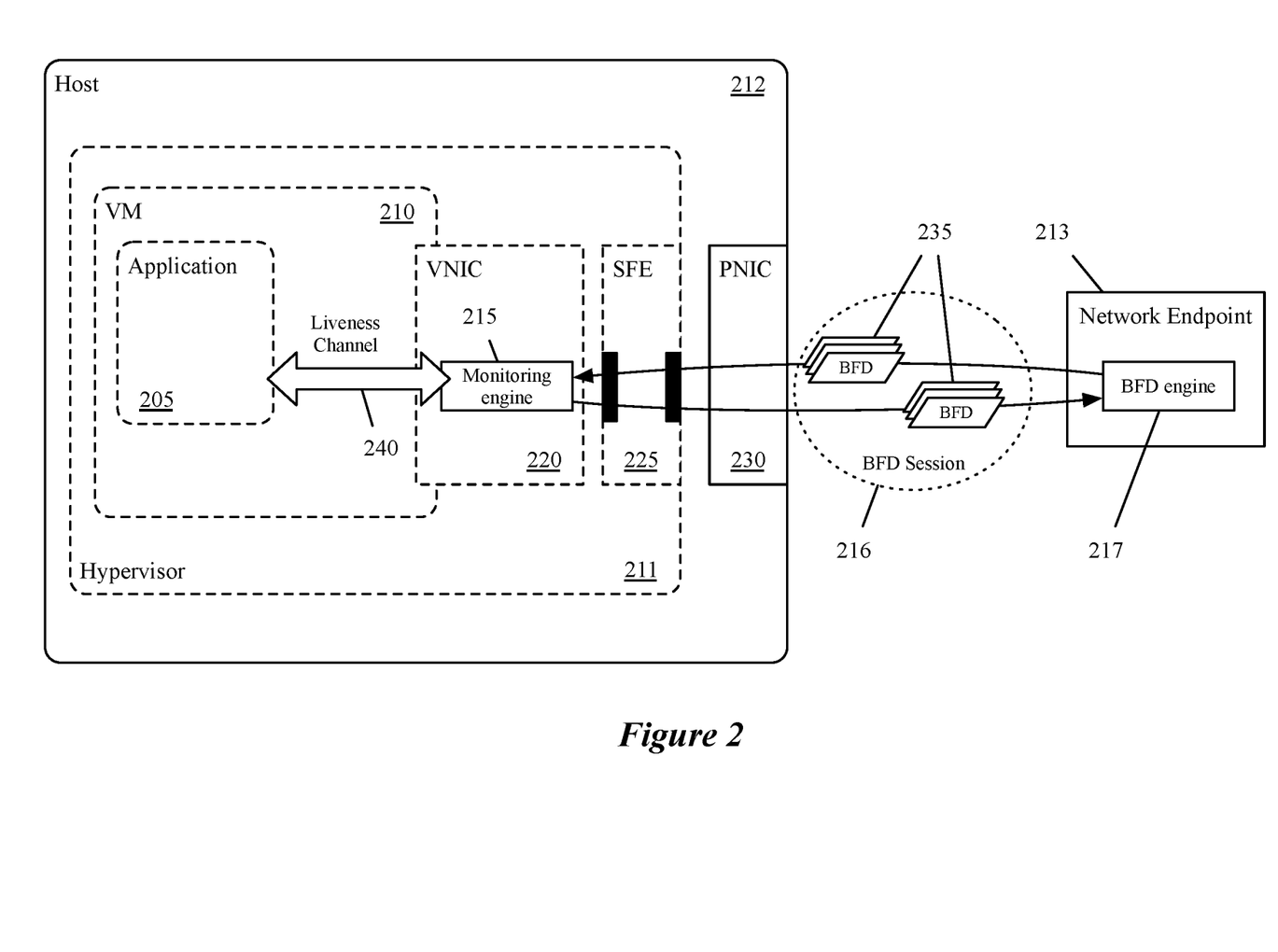
FIG. 2 conceptually illustrates a scenario of some embodiments for offloading a BFD monitoring session from an application to the VNIC.

As illustrated in FIG. 2 an application 205, running in a virtual machine (VM) 210 that executes in a hypervisor 211 of a host computer 212, uses BFD in some embodiments to monitor its network connection to a network endpoint 213. The network endpoint 213 is in some embodiments a tunnel endpoint such as for a VLAN or VXLAN, implemented by another host computer, e.g. by another machine or another forwarding element executing on the other host computer.

The monitoring engine 215 establishes a BFD session 216 with a BFD engine 217 at the network endpoint 213. However, unlike in prior art FIG. 1, the monitoring engine 215 (which incorporates a BFD engine and implements the BFD state machine) is executed by a VNIC 220 associated with the VM 210 instead of by the application 205. In some embodiments, the VNIC 220 is a software construct that operates within the memory space of the VM 210. Alternatively or conjunctively, in some embodiments the VNIC has a component that operates within the memory space of the hypervisor 211. This is illustrated visually in FIG. 2 by depicting the VNIC 220 as partially within the VM 210 and partially outside it, in the hypervisor 211. The memory spaces of the VM 210, the hypervisor 211, and the VNIC components are described in further detail with reference to FIG. 3 below.

The datapath between the application 205 and the network endpoint 213 includes in some embodiments the VNIC 220, a software forwarding element (SFE) 225 that performs switching and routing for all machines implemented by the hypervisor 211, and a PNIC 230 of the host computer 212. Data traffic messages (not shown) between the application 205 and the network endpoint 213, and BFD packets 235 between the monitoring engine 215 and the BFD engine 217 at the network endpoint 213, all must traverse the datapath in both directions through the VNIC 220, logical ports associated with the SFE 225 (conceptually depicted as black boxes), and the PNIC 230. The network connection between the application 205 and the network endpoint 213 is in some embodiments a tunnel with one tunnel endpoint at SFE 225, and the other tunnel endpoint at network endpoint 213.

As a result of implementing the monitoring engine 215 at the VNIC 220, BFD packets 235 need only traverse the datapath up to the VNIC 220 instead of being required to transit all the way to the application 205. BFD operates on top of any data protocol (network layer, link layer, tunnels, etc.) used to exchange data messages between the application 205 and the network endpoint 213. In some embodiments, it is run in a unicast, point-to-point mode. BFD packets 235 may be carried as the payload of whatever encapsulating protocol (e.g., VXLAN, VLAN, GRE, etc.) is appropriate for the medium and network. In some embodiments, BFD runs at multiple layers (e.g., TCP/IP layers, or Open Systems Interconnection layers) in a system.

BFD can provide failure detection on any kind of path between systems, including direct physical links, virtual circuits, tunnels, MPLS Label Switched Paths (LSPs), multi-hop routed paths, and unidirectional links (so long as there is some return path). Multiple BFD sessions can be established between the same pair of systems when multiple paths between them are present in at least one direction, even if a lesser number of paths are available in the other direction (multiple parallel unidirectional links or MPLS LSPs, for example). The BFD protocol is described in more detail in Internet Engineering Task Force (IETF) RFC 5880, titled "Bidirectional Forwarding Detection (BFD)", which is incorporated herein by reference.

The network endpoint 213 is in some embodiments another application running in a different VM on the same host computer 212, or in other embodiments a VM running on a different host computer (not shown). In some embodiments, the host computer 212 is an edge appliance, and the monitoring engine 215 is used for north-south traffic, with the network endpoint 213 external to the network. In other embodiments, the monitoring engine can also be used for east-west traffic within the network. If the host computer 212 executes VMs for different logical routers, then each logical router has its own BFD session in some embodiments, which need to be isolated from each other accordingly. The logical context of a BFD session is bound to the encapsulation of the network connection or link which each BFD session is monitoring.

Generally, since BFD packets are delivered via the datapath, they are susceptible to being dropped due to network congestion. The BFD protocol does not support packet prioritizing or quality of service (QoS) to ensure that BFD packets are recognized and expedited through. It is possible to analyze the signature of BFD packets to detect them and apply priority, but this requires proprietary hardware support at the PNIC level, as described in further detail by U.S. Patent Publication 2018/0159790 titled "Prioritizing Flows in Software Defined Networks", incorporated herein by reference. For most systems, this solution is not available, since compute resources are very limited at the PNIC.

By offloading the monitoring engine to the VNIC, the round-trip of BFD packets from the VNIC to the application and back (as seen in prior art FIG. 1) is reduced, which saves a considerable amount of processing cycles from the VM kernel point of view, and reduces the probability that a BFD packet is dropped. However, the separation of the application 205 from the monitoring engine 215 introduces a requirement of communication between the application and the VNIC, to communicate the operational status (also referred to as "liveness") of the application to the monitoring engine and the status of the network connection to the application. In some embodiments, the monitoring engine handles that communication by establishing a liveness channel 240, described in more detail below with reference to FIG. 3.

Figure 3:
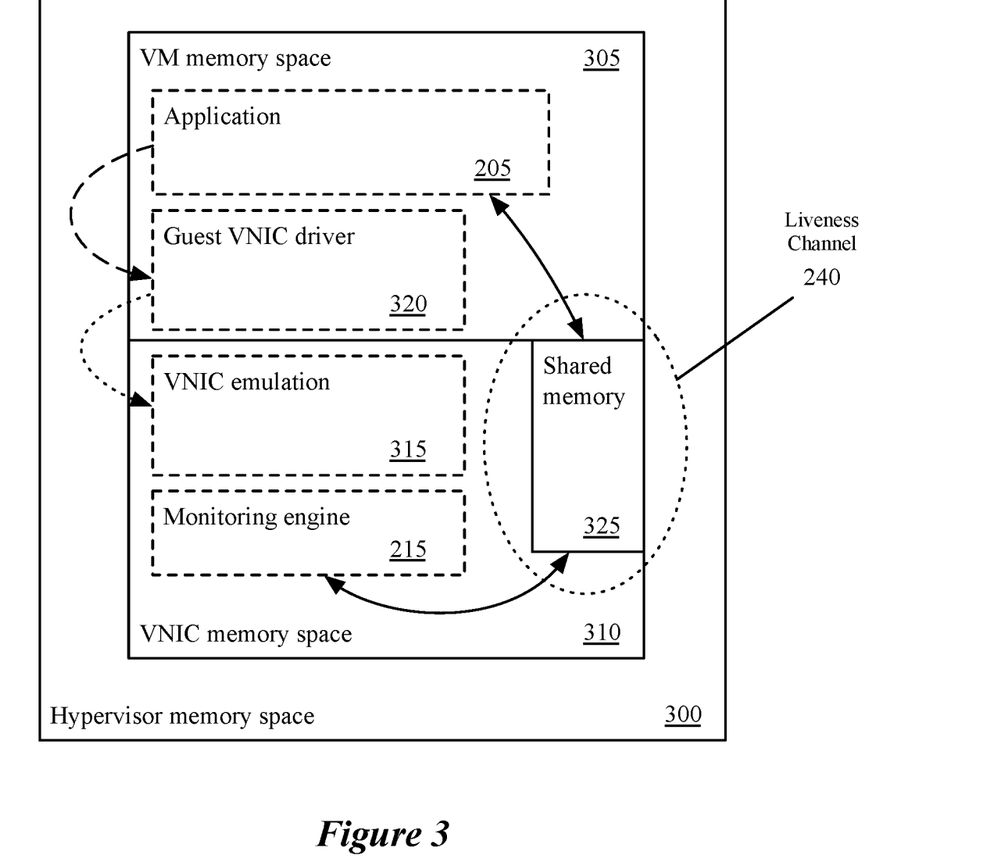
FIG. 3 conceptually illustrates the memory space of a hypervisor of some embodiments that implements a VM and a VNIC.

In some embodiments, the VNIC 220 is implemented by virtualization software (e.g., a hypervisor) 211 executing on the host computer 212. The same hypervisor 211 also runs the VM 210 in some embodiments. FIG. 3 conceptually illustrates the memory space 300 of a hypervisor of some embodiments that implements a VM and a VNIC. For the sake of clarity, the software forwarding element (SFE) and ports depicted in FIG. 1 and FIG. 2 are omitted from this figure.

The hypervisor memory space 300 allocates separates areas in memory for each VM and each associated VNIC. These areas are referred to as the VM memory space 305 and the VNIC memory space 310. The application 205 executes in the VM memory space 305, and the VNIC emulation 315 executes in the VNIC memory space 310. The VNIC emulation 315 is a software-based emulation of a physical NIC, which executes on the host 212 (e.g., in the hypervisor 211 executing on the host). In some embodiments, there are multiple applications running in a given VM's memory space, and there are multiple VMs running in the hypervisor's memory space. These multiple VMs have their own associated VNIC emulations in some embodiments, or share VNIC emulations in other embodiments.

A guest VNIC driver 320 also executes in the VM memory space 305 in some embodiments. This driver provides a software interface (e.g., an API) to the VNIC emulation 315 for applications in the VM to utilize, as depicted by the dashed line. To facilitate communication between the VM and the network endpoint 213, the guest VNIC driver 320 in the VM exchanges data (as depicted by the dotted line) with the VNIC emulation 315 in the VNIC memory space 310, and the VNIC emulation 315 exchanges data with the PNIC (not shown).

As discussed above, the monitoring engine 215 of some embodiments (which incorporates a BFD engine and implements the BFD state machine) is offloaded to the VNIC, so it executes within the VNIC memory space 310 instead of the VM memory space 305. As a result, the application no longer has direct awareness of the state of the BFD monitoring session, since it is located in a separate memory space. Likewise, the monitoring engine is now separated from the application and therefore has no way to determine if the application is operational.

To resolve this gap in some embodiments, the monitoring engine establishes a communications channel with the application, in order to periodically verify that the application is operational (e.g., referred to as a "liveness" channel). In some embodiments, the application 205 updates the monitoring engine 215 with its operational status. In some embodiments, monitoring engine 215 polls (e.g., queries) the application 205 for its operational status. If the monitoring engine 215 determines that the application 205 has failed (e.g., via updating or polling), then the monitoring engine 215 terminates the monitoring session.

For example, in some embodiments the liveness channel is an application programming interface (API) of the VNIC. In other embodiments, the liveness channel 240 is a shared memory 325 defined in the VNIC memory space 310. The application 205 and the monitoring engine 215 both have read access (represented by solid arrows in FIG. 3) to the shared memory 325. For example, in some embodiments the monitoring engine 215 periodically receives status messages via the liveness channel 240 from the application 205. In such embodiments, the application 205 also has write access to the shared memory 325. Therefore, the status messages in some embodiments are written to the shared memory 325 by the application 205 on a periodic basis. The monitoring engine 215 periodically reads the shared memory 325 to determine if a status message has been written within a configurable period of time. The monitoring engine 215 then interprets failure to receive expected status messages as failure of the application 205.

In some embodiments, the status message is a timestamp that indicates a last known time that the application 205 was operational. After reading the timestamp, the monitoring engine 215 calculates and compares the time elapsed since the timestamp to the configurable period of time, e.g. a failure threshold. If the elapsed time is less than the failure threshold, the application is considered operational. If the elapsed time is greater than the failure threshold, the application is considered to have failed.

As another example, the monitoring engine 215 in some embodiments periodically queries the application 205 via the liveness channel 240, and then awaits a reply from the application within a period of time. Failure to reply to the query within that period of time is interpreted by the monitoring engine 215 as failure of the application 205. In some embodiments, the query and the reply are written to and read from the shared memory 325 by the application 205 and the monitoring engine 215. In some embodiments, the monitoring engine 215 queries the application after failing to receive a status update as described above, as a verification method before concluding that the application has failed. In other embodiments, the monitoring engine 215 communicates directly with the application 205, or communicates via the VNIC emulation 315, in order to query or poll the application regarding its liveness status.

Figure 4:
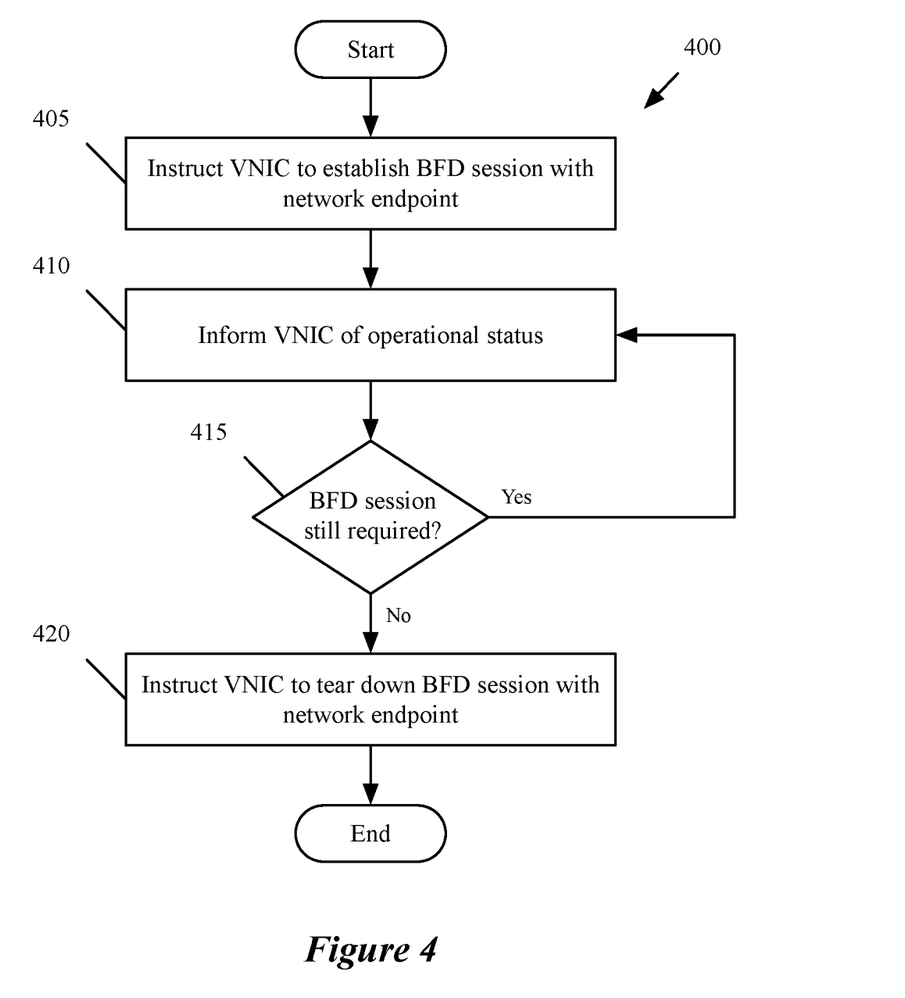
FIG. 4 conceptually illustrates a process performed by an application in some embodiments to offload a BFD monitoring session to the VNIC.

FIG. 4 conceptually illustrates a process 400 performed by the application 205 in some embodiments to offload a BFD monitoring session to the VNIC 220. The process 400 begins at 405 by instructing the VNIC to establish the BFD session with the network endpoint 213. In some embodiments, the process 400 uses an API of the VNIC (e.g., of the VNIC emulation 315 executing in the VNIC memory space 310) for this instruction. This instruction includes in some embodiments a set of parameters that define the configuration of the BFD session, as discussed in further detail below with reference to FIG. 5.

In some embodiments, the application determines that the session is required after initiating a connection to exchange data messages with the network endpoint 213. The determination is in some embodiments automatic, or in other embodiments is part of a configuration process for the application or the VM that operates it.

The process 400 informs the VNIC at 410 of its operational status. As discussed above, the application executing the process 400 in some embodiments informs the VNIC of its operational status by sending a status update to the VNIC through the liveness channel 240. The status update is a timestamp or other incrementing value in some embodiments. In some embodiments where the application includes several different components, the application provides separate status updates for each component.

The process 400 determines at 415 whether the application still requires the BFD session. In some embodiments, the application no longer requires the session because it has ceased exchanging data with the network endpoint 213. If the process determines that the BFD session is still required, then the process 400 returns to 410, which was described above. In some embodiments the determination whether the BFD session is still required is performed at a regular, configurable interval.

If the process 400 determines that the BFD session is no longer required, then the process instructs the VNIC at 420 to tear down the BFD session with the network endpoint 213. In some embodiments, the process 400 uses an API of the VNIC (e.g., of the VNIC emulation 315 executing in the VNIC memory space 310) for this instruction. The process 400 then ends.

As noted above, in some embodiments the monitoring engine 215 establishes the BFD session with a network endpoint 213 with which the application 205 is communicating (e.g., another VM on another host computer). The monitoring engine 215 then regularly exchanges control messages (e.g., BFD packets) with the network endpoint 213 during the session, according to the BFD protocol. In some embodiments, the network endpoint is another VM or another forwarding element on another host computer. The network endpoint 213 in some embodiments also executes its own monitoring engine (e.g., at that other VM or other forwarding element) to send and receive the BFD packets with the first monitoring engine 215. These BFD packets are sent over the data plane, using the same network connection in some embodiments as the data messages that the application 205 exchanges with the network endpoint 213. The monitoring engine 215 then interprets failure to receive expected BFD packets as failure of the network connection. If the monitoring engine 215 determines that the BFD session with the network endpoint 213 has failed, then the monitoring engine 215 notifies the application 205, through the liveness channel 240 in some embodiments.

Figure 5:
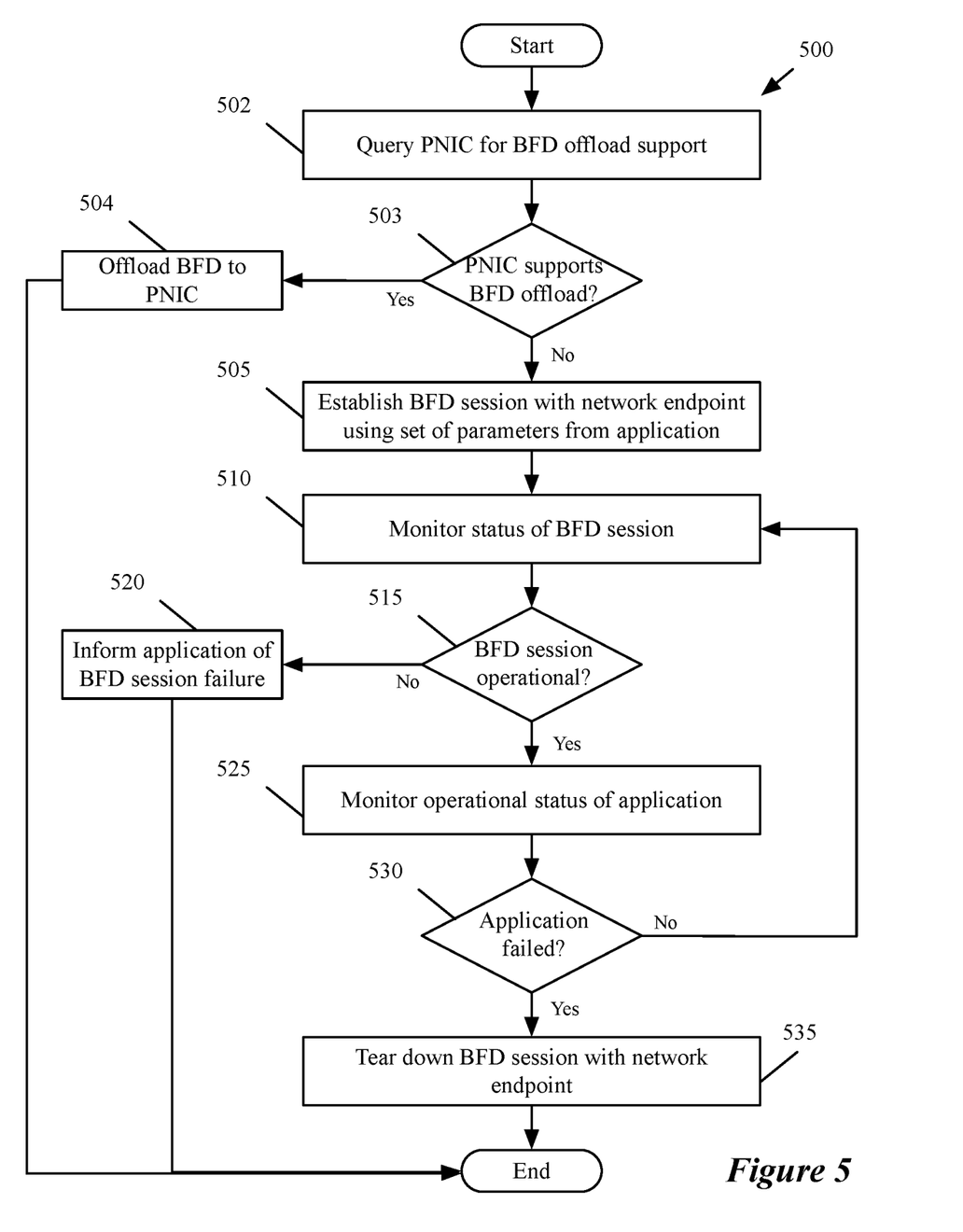
FIG. 5 conceptually illustrates a process performed by a VNIC in some embodiments to establish an offloaded BFD monitoring session with a network endpoint.

FIG. 5 conceptually illustrates a process 500 performed by the VNIC 220 in some embodiments to establish an offloaded BFD monitoring session with the network endpoint 213. The process 500 is performed by a monitoring engine 215 that executes on the VNIC 220 in some embodiments.

In some embodiments, the process 500 queries at 502 the physical NIC (PNIC) of the host computer to see if it supports BFD offloading. If the process determines at 503 that the PNIC supports BFD offload, then the physical NIC executes at 504 the remainder of process 500. The process then ends at the VNIC 220. If the process determines at 503 that the PNIC does not support BFD offload, then the process 500 continues at the VNIC 220.

The process 500 establishes the BFD session at 505 with the network endpoint 213. In some embodiments, the process establishes the session after receiving instructions from the application 205, which exchanges data messages with the network endpoint 213 over a network connection. The process 500 may also terminate the session, based on instructions received from the application (e.g., if the application determines that the BFD session is no longer necessary, as in operation 415 of process 400 described in FIG. 4 above).

In some embodiments, the process 500 uses a set of parameters received from the application 205 to establish the BFD session. These parameters are received through the liveness channel 240 in some such embodiments. The process 500 uses these parameters to configure the BFD session. Examples of these parameters include a network address of the VM that operates the application 205, a network address of the network endpoint, and a frequency of the control messages sent over the network connection. The process 500 also updates the BFD session configuration with additional parameters if received from the application 205.

In some embodiments, the BFD session is established with the network endpoint using a BFD handshake, which is an exchange of Hello message packets. During the handshake, the process 500 sends a first message to the network endpoint 213 that contains a unique identifier (e.g., the Internet Protocol address of the VNIC 220). The network endpoint 213, on receiving the first message, replies with its own Hello message that contains its own unique identifier and the unique identifier of the VNIC 220. At this point, the process 500 knows that the endpoint received its message, since it contained the VNIC's unique identifier, and transitions out of a peering state to an active monitoring state. The process 500 then sends another Hello message to the network endpoint 213, containing the endpoint's unique identifier from the second Hello message (unlike the first message, which did not have the network endpoint's identifier). When the network endpoint 213 receives this third Hello message, it also knows that the VNIC received its message, since it contained the endpoint's unique identifier, and likewise transitions out of a peering state to an active monitoring state. In some embodiments, the BFD session is initiated by the network endpoint instead of the process 500, in which case the roles are reversed.

Once both the process 500 and the network endpoint 213 have entered the active monitoring state, the process 500 monitors at 510 the status of the established BFD session. This is achieved in some embodiments by routinely sending and receiving BFD packets to and from the network endpoint at regular, configurable intervals. The process 500 exchanges the BFD packets with the network endpoint 213 over the same network connection used by the application 205 to exchange data messages.

In some embodiments the network connection is a tunnel, so the process 500 encapsulates BFD packets for the tunnel outbound to the network endpoint, and decapsulates BFD packets received from the network endpoint. In some such embodiments, the tunnel endpoint addresses are among the configuration parameters received from the application 205.

For example, in some such embodiments the network endpoint 213 is another application executing in a VM on another host computer, and the BFD session is therefore established over the tunnel to the other host computer.

The process determines at 515 whether the BFD session being monitored is operational. In some embodiments, if the process 500 has received a BFD packet within the expected interval, then the BFD session is considered to be operational. If the process 500 does not receive the expected BFD packet, then the session is considered to have failed, and the process continues to 520 which is described below. This determination is made in some embodiments on a recurring basis, with a configurable frequency. In some embodiments, this frequency is one of the configuration parameters received from the application 205.

Upon determining that the BFD session has failed, the process 500 informs the application 205 at 520. In some embodiments, the process 500 uses the liveness channel 240 to inform the application 205. In some embodiments, the process 500 uses a method of informing the application with a higher priority, e.g. an interrupt message.

Otherwise, if the process 500 determined that the BFD session is operational, in some embodiments the process informs the application 205. In some embodiments, the application is informed of the session's operational status at a regular, configurable interval. In some embodiments, this interval is one of the configuration parameters received from the application 205. In such embodiments, failure to notify the application that the session is operational within that interval is interpreted by the application as failure of the session.

The process 500 also monitors at 525 the operational status of the application 205. As discussed above with reference to FIG. 3, the process monitors the liveness through the liveness channel 240 by receiving updates from the application 205 in some embodiments, or by polling the application in other embodiments. As described above, the liveness channel may be an API of the VNIC, or may be a shared memory space to which both the process 500 and the application 205 have read and/or write access.

The process 500 determines at 530 whether the application 205 is operational (i.e., that the application is "alive") or has failed. In some embodiments, the application is determined to be operational if it updates a shared memory space 325 on a regular basis. In some other embodiments, the application is determined to be operational if the process 500 receives a reply to a liveness query. If the application 205 is determined to be operational (e.g., the application has not failed), the process 500 returns to 510, which was described above.

In some embodiments, the application 205 is determined to not be operational if the process 500 does not receive the expected status messages from the application, and/or does not receive a reply to a liveness query. Upon determining that the application is not operational, the process 500 tears down the BFD session at 535. The process 500 then ends.

One of ordinary skill in the art will understand that operations 510-520 relating to determining the status of the BFD session are independent of operations 525-535 relating to determining the status of the application. In some embodiments, some of these operations occur in a different sequence or are omitted.

As noted above, in some embodiments, at least a portion of process 500 is performed by a PNIC instead of a VNIC, for example when the process determines (at 503) that the PNIC supports BFD offload. In some such embodiments, the PNIC uses a separate liveness channel from the VNIC in order to determine the operational status of the application. In other such embodiments, the PNIC accesses the same liveness channel as used by the VNIC in order to determine the operational status of the application (e.g., by using an API of the VNIC). Such a liveness channel is illustrated in FIG. 3 as a shared memory space 325 in the VNIC. Alternatively or conjunctively, the PNIC may use the VNIC emulation 315 to relay the liveness information.

Figure 6:
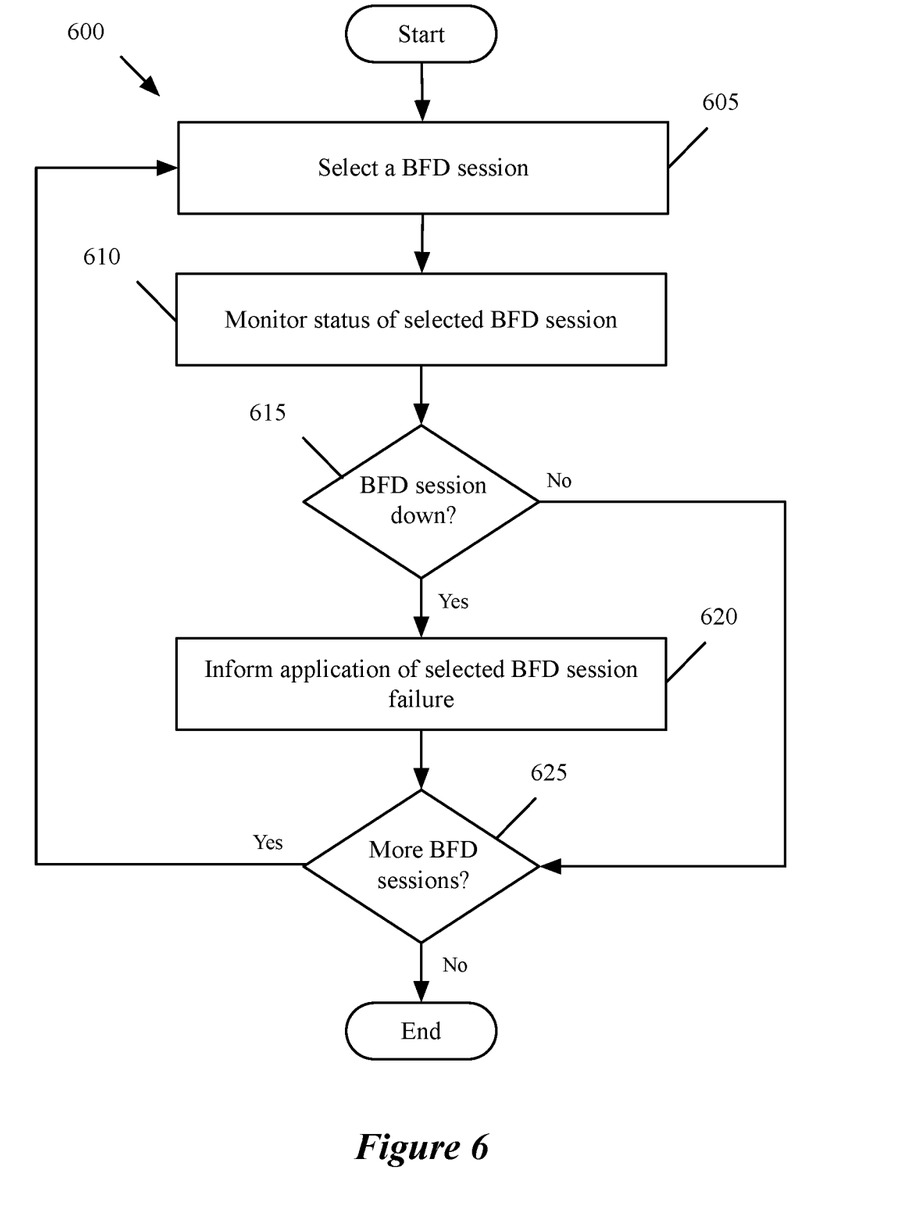
FIG. 6 conceptually illustrates a process for a monitoring engine that manages multiple monitoring sessions.

In some embodiments, the monitoring engine 215 establishes multiple BFD sessions, with a mix of multiple different network endpoints and on behalf of multiple different applications. The application or applications perform process 400 as described above to establish each different BFD session with corresponding network endpoints. FIG. 6 conceptually illustrates a process 600 for a monitoring engine 215 that manages multiple monitoring sessions. In some embodiments, process 600 is executed by a VNIC (or a PNIC), as part of operations 515-520 of process 500, as described above with reference to FIG. 5.

The process 600 selects a BFD session at 605 from the multiple monitoring sessions. The selected session is between a particular application and a particular network endpoint. In some embodiments, the multiple monitoring sessions are with multiple network endpoints. These network endpoints may be tunnel endpoints (e.g., VXLAN, VLAN, GRE, etc.) implemented by forwarding elements or machines executing on one or more host computers. In some embodiments, some of these multiple network endpoints are located at different host computers, and are therefore established and maintained over different corresponding VXLAN, VLAN, GRE, etc. network connections. Alternatively or conjunctively, in some embodiments some of these multiple network endpoints are located at different machines or applications on a single host computer, and are therefore able to share at least one network connection. Different BFD sessions that share a network connection are isolated from each other in some embodiments by embedding additional context (e.g., a destination IP or MAC address, a VXLAN or VLAN tag, a tunnel endpoint identifier, etc.) into the encapsulation of their respective BFD packets.

In some embodiments, the multiple monitoring sessions are on behalf of multiple different applications. The different applications operate within the same machine or within different machines on the same host computer 212. In some embodiments, the multiple applications are completely separate applications. In other embodiments, the different applications are different application components, such as in a multi-tier software architecture where different components implement different functions (e.g., web, database, and application logic). These components are implemented in some embodiments as different processes executing within a single virtual machine, or in other embodiments as fully separate virtual machines. In some such embodiments, the monitoring engine 215 establishes separate liveness channels with the different applications or application components. In some embodiments, the monitoring engine 215 establishes a single liveness channel to a given machine, which is shared by all applications operating within that machine. The failure of any single application (or application component) would in some such embodiments be interpreted by the monitoring engine as a failure of the machine as a whole, requiring termination of all associated sessions with that machine.

The process 600 monitors the selected session at 610, by exchanging BFD packets with the corresponding network endpoint. In some embodiments, each BFD session has a unique identifier, which is used by the process 600 to isolate BFD packets from different sessions and endpoints. The unique identifier is written into outgoing BFD packet headers by the monitoring engine at the VNIC and read from incoming BFD packet headers from the corresponding network endpoint for the selected session.

The process 600 determines at 615 whether the selected session is down. As noted above, in some embodiments, if the process 600 has received a BFD packet corresponding to the selected session within the expected interval, then the selected BFD session is considered to be operational, and the process proceeds to 625, which is described below. If the process 600 does not receive the expected BFD packet, then the session is considered to have failed, and the process continues to 620 which is described below.

Upon determining that the selected BFD session has failed, the process 600 informs the corresponding application 205 of the failure at 620. In some embodiments, the process 600 uses the liveness channel 240 to inform the application 205. In some embodiments, the process 600 uses a method of informing the corresponding application with a higher priority, e.g. an interrupt message. In some embodiments, the process 600 also informs the corresponding application if the BFD session is operational.

The process 600 determines at 625 whether there are additional BFD sessions to manage. If there are additional BFD sessions, the process 600 returns to operation 605, which was described above. If there are no additional BFD sessions, the process 600 ends. In some embodiments, the process 600 cycles through all available BFD sessions, and then starts over again with the first BFD session. The process 600 may also execute operations 610-620 in parallel for different BFD sessions.

As used in this document, the term data packet, packet, data message, or message refers to a collection of bits in a particular format sent across a network. It should be understood that the term data packet, packet, data message, or message may be used herein to refer to various formatted collections of bits that may be sent across a network, such as Ethernet frames, IP packets, TCP segments, UDP datagrams, etc. While the examples above refer to data packets, packets, data messages, or messages, it should be understood that the invention should not be limited to any specific format or type of data message.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 7:
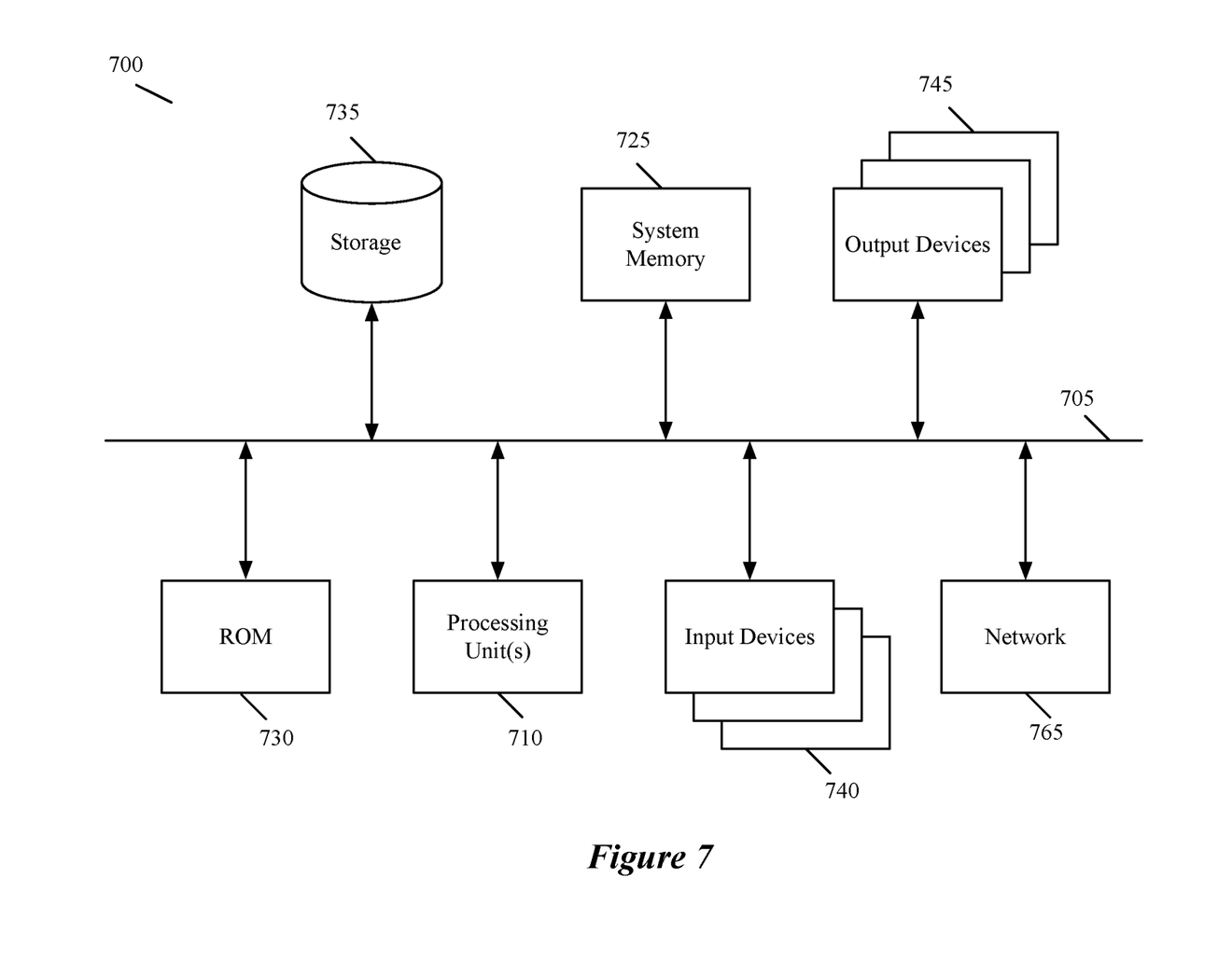
FIG. 7 conceptually illustrates an electronic system with which some embodiments of the invention are implemented.

FIG. 7 conceptually illustrates an electronic system 700 with which some embodiments of the invention are implemented. The electronic system 700 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 700 includes a bus 705, processing unit(s) 710, a system memory 725, a read-only memory 730, a permanent storage device 735, input devices 740, and output devices 745.

The bus 705 collectively represents all system, peripheral, and chipset buses that communicatively connect the numerous internal devices of the electronic system 700. For instance, the bus 705 communicatively connects the processing unit(s) 710 with the read-only memory 730, the system memory 725, and the permanent storage device 735.

From these various memory units, the processing unit(s) 710 retrieve instructions to execute and data to process in order to execute the processes of the invention. The processing unit(s) may be a single processor or a multi-core processor in different embodiments.

The read-only-memory (ROM) 730 stores static data and instructions that are needed by the processing unit(s) 710 and other modules of the electronic system. The permanent storage device 735, on the other hand, is a read-and-write memory device. This device is a non-volatile memory unit that stores instructions and data even when the electronic system 700 is off. Some embodiments of the invention use a mass-storage device (such as a magnetic or optical disk and its corresponding disk drive) as the permanent storage device 735.

Other embodiments use a removable storage device (such as a floppy disk, flash drive, etc.) as the permanent storage device. Like the permanent storage device 735, the system memory 725 is a read-and-write memory device. However, unlike storage device 735, the system memory is a volatile read-and-write memory, such as random-access memory. The system memory stores some of the instructions and data that the processor needs at runtime. In some embodiments, the invention's processes are stored in the system memory 725, the permanent storage device 735, and/or the read-only memory 730. From these various memory units, the processing unit(s) 710 retrieve instructions to execute and data to process in order to execute the processes of some embodiments.

The bus 705 also connects to the input and output devices 740 and 745. The input devices enable the user to communicate information and select commands to the electronic system. The input devices 740 include alphanumeric keyboards and pointing devices (also called "cursor control devices"). The output devices 745 display images generated by the electronic system. The output devices include printers and display devices, such as cathode ray tubes (CRT) or liquid crystal displays (LCD). Some embodiments include devices such as a touchscreen that function as both input and output devices.

Finally, bus 705 also couples electronic system 700 to a network 765 through a network adapter (not shown). In this manner, the computer can be a part of a network of computers (such as a local area network ("LAN"), a wide area network ("WAN"), or an Intranet, or a network of networks, such as the Internet. Any or all components of electronic system 700 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

This specification refers throughout to computational and network environments that include virtual machines (VMs). However, virtual machines are merely one example of data compute nodes (DNCs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system isolates the containers for different tenants and therefore provides operating-system level segregation of the different groups of applications that operate within different containers. This segregation is akin to the VM segregation that is offered in hypervisor-virtualized environments, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESX hypervisor of VMware Inc.

One of ordinary skill in the art will recognize that while the specification refers to VMs, the examples given could be any type of DCNs, including physical hosts, VMs, non-VM containers, and hypervisor kernel network interface modules. In fact, the example networks could include combinations of different types of DCNs in some embodiments.

While the invention has been described with reference to numerous specific details, one of ordinary skill in the art will recognize that the invention can be embodied in other specific forms without departing from the spirit of the invention. In addition, at least one figure conceptually illustrates a process. The specific operations of this process may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

The invention claimed is:

1. A method for monitoring a status of a tunnel between first and second host computers, the method comprising:
   at a tunnel monitor executing on the first host computer that also separately executes a machine that uses the tunnel to send messages to or receive messages from the second host computer:
      establishing a liveness channel with the machine to iteratively determine whether the machine is operational;
      establishing a monitoring session with the second host computer to iteratively determine whether the tunnel is operational;
      when a determination is made through the liveness channel that the machine is no longer operational, terminating the monitoring session with the second host computer; and
      when a determination is made that the tunnel is no longer operational, notifying the machine through the liveness channel;
      wherein a forwarding element executes separately from the machine on the first host computer, said forwarding element for forwarding messages between the machine and the second host computer;
      wherein the forwarding element serves as an endpoint for the tunnel; and
      wherein a virtual network interface card (VNIC) executes on the first host computer for providing messages to the machine and the forwarding element, wherein the VNIC comprises the tunnel monitor.

2. The method of claim 1, wherein the first host computer comprises a physical network interface card (PNIC), wherein establishing a monitoring session with the second host computer comprises determining that the PNIC does not support executing a tunnel monitor.

3. The method of claim 1, wherein a determination that is made through the established liveness channel that the machine is no longer operational comprises a determination that an application that is a source or destination of the data messages has failed.

4. The method of claim 3 further comprising receiving a set of status messages through the liveness channel from the application while the application is operational, wherein the determination that the application has failed comprises a determination that a status message has not been received through the liveness channel from the process within a particular period of time.

5. The method of claim 3, wherein the determination that the application has failed comprises:
sending through the liveness channel a status query to the application; and
determining that a reply to the status query has not been received through the liveness channel within a particular period of time.

6. The method of claim 3, wherein the application is a first application in a plurality of applications operating in the machine, wherein the monitoring session is a first monitoring session in a plurality of monitoring sessions with a plurality of other host machines exchanging data messages with the plurality of applications, the method further comprising providing a status update to the machine for each monitoring session.

7. The method of claim 1, wherein establishing the monitoring session comprises exchanging a set of control messages with the second host computer through the tunnel.

8. The method of claim 7, wherein a determination that is made through the monitoring session that the tunnel is no longer operational comprises a determination that a control message has not been received from the second host computer within a particular period of time.

9. The method of claim 1, wherein the machine is a first machine, wherein a second machine executes on the second host computer, wherein the second machine exchanges data messages with the first machine.

10. The method of claim 9, wherein establishing the monitoring session comprises exchanging a set of control messages with the second machine.

11. The method of claim 9, wherein the forwarding element is a first forwarding element, wherein a second forwarding element executes on the second host computer separately from the second machine, wherein establishing the monitoring session comprises exchanging control messages with the second forwarding element.

12. The method of claim 1, wherein the liveness channel comprises an application programming interface (API).

13. A non-transitory machine readable medium storing a program which when executed by a processing unit monitors a status of a tunnel between first and second host computers, the program comprising sets of instructions for:
at a tunnel monitor executing on the first host computer that also separately executes a machine that uses the tunnel to send messages to or receive messages from the second host computer:
establishing a liveness channel with the machine to iteratively determine whether the machine is operational;
establishing a monitoring session with the second host computer to iteratively determine whether the tunnel is operational;
when a determination is made through the liveness channel that the machine is no longer operational, terminating the monitoring session with the second host computer; and
when a determination is made that the tunnel is no longer operational, notifying the machine through the liveness channel;
wherein a forwarding element executes separately from the machine on the first host computer, said forwarding element for forwarding messages between the machine and the second host computer;
wherein the forwarding element serves as an endpoint for the tunnel; and
wherein a virtual network interface card (VNIC) executes on the first host computer for providing messages to the machine and the forwarding element, wherein the VNIC comprises the tunnel monitor.

14. The non-transitory machine readable medium of claim 13, wherein a determination that is made through the established liveness channel that the machine is no longer operational comprises a determination that an application that is a source or destination of the data messages has failed, wherein the application is a first application in a plurality of applications operating in the machine, wherein the monitoring session is a first monitoring session in a plurality of monitoring sessions with a plurality of other host machines exchanging data messages with the plurality of applications, the program further comprising a set of instructions for providing a status update to the machine for each monitoring session.

15. The non-transitory machine readable medium of claim 13, wherein the set of instructions for establishing the monitoring session with the second host computer comprises sets of instructions for:
receiving a set of parameters from the machine through the liveness channel; and
using the received set of parameters, configuring the monitoring session.

16. The non-transitory machine readable medium of claim 15, wherein the received set of parameters comprises an address of the machine, an address of the second host computer, and a frequency for control messages exchanged through the monitoring session with the second host computer.

17. The non-transitory machine readable medium of claim 13, wherein the program further comprises sets of instructions for:
receiving a notification from the first machine that the monitoring session is no longer required; and
based on the notification, terminating the monitoring session with the second host computer.

* * * * *